United States Patent [19]
Lewyn

[11] Patent Number: 5,670,862
[45] Date of Patent: Sep. 23, 1997

[54] RAPID CHARGING TECHNIQUE FOR LITHIUM ION BATTERIES

[75] Inventor: Lanny L. Lewyn, Laguna Beach, Calif.

[73] Assignee: Siliconix incorporated, Santa Clara, Calif.

[21] Appl. No.: 615,517

[22] Filed: Mar. 12, 1996

[51] Int. Cl.⁶ .................... H01M 10/44; H01M 10/46
[52] U.S. Cl. ................... 320/21; 320/23; 320/32; 320/39
[58] Field of Search .................... 320/20, 21, 22, 320/23, 32, 39, 43, 48

[56] References Cited

U.S. PATENT DOCUMENTS

| | | | |
|---|---|---|---|
| 4,977,364 | 12/1990 | Kordesch et al. | 320/21 |
| 5,179,335 | 1/1993 | Nor | 320/21 |
| 5,237,259 | 8/1993 | Sanpei | 320/23 |
| 5,304,915 | 4/1994 | Sanpei | 320/14 |
| 5,352,968 | 10/1994 | Reni et al. | 320/48 X |
| 5,403,093 | 4/1995 | Flynn, Jr. et al. | 320/48 X |
| 5,408,170 | 4/1995 | Umetsu et al. | 320/39 |
| 5,596,259 | 1/1997 | Mino et al. | 320/21 |
| 5,604,418 | 2/1997 | Andrieu et al. | 320/21 |

*Primary Examiner*—Peter S. Wong
*Assistant Examiner*—Patrick B. Law
*Attorney, Agent, or Firm*—Skjerven, Morrill, MacPherson, Franklin & Friel; Brain D. Ogonowsky

[57] ABSTRACT

A circuit for charging a lithium-ion battery and a technique for charging the battery are described. The battery charger takes into account the electrical series resistance (ESR) of the battery. The charger contains a compensation circuit which outputs the battery terminal voltage minus the expected voltage drop across the ESR of the battery. This resulting voltage is then applied to the sense terminals of the power supply. The voltage applied to the sense terminals of the power supply is, thus, representative of the active electrode voltage (AEV) of the battery. The power supply then provides sufficient charging current to maintain the voltage at the sense terminals at a preset voltage limit. Using this technique, the lithium-ion battery is charged to within 99.5% of its full charge in about half of the time required by the prior art.

25 Claims, 7 Drawing Sheets

RAPID CHARGING TECHNIQUE FOR LITHIUM ION BATTERIES

FIELD OF THE INVENTION

This invention relates to battery chargers and, more particularly, to a technique for charging a lithium-ion battery.

BACKGROUND OF THE INVENTION

A significant amount of research money has been expended on achieving higher efficiency in electrical energy storage. The development of lithium-ion batteries is one of the more recent examples of such an effort. These batteries have twice the energy storage density of the nickel-metal-hydride (NiMH) systems in widespread commercial use for portable computers and camcorders.

One feature of several lithium-ion systems is the relatively flat voltage versus charge characteristic exhibited by the battery during charging or discharging. The relatively flat voltage characteristic of a lithium-ion battery when discharging provides increased power near the end of discharge in comparison to a sloping voltage characteristic typical of prior art nicad or nickel-metal-hydride systems. The flat voltage characteristic of the lithium-ion batteries presents some difficulties which must be overcome to obtain fast and complete charging of the battery. The slope of the voltage versus charge characteristic is approximately 1 volt per 2.4 AH.

A typical prior art battery charger for conventional batteries, including lithium-ion batteries, is shown as charger 10 in FIG. 1. Power supply 11 provides the charging current. A lithium-ion battery 12 is shown having external battery terminals 13 and 14 connected to the plus and minus power supply terminals 16 and 17 (also known as the force terminals). Battery terminals 13 and 14 are also coupled to sense terminals 18 and 19 on power supply 11 so that the power supply 11 can monitor the battery voltage.

Power supply 11 supplies the necessary current, up to a preset current limit, to battery 12 to maintain the battery voltage at a preset voltage, commonly called the maintenance voltage. The maintenance voltage for a battery is the voltage at which the battery internal electrodes can be maintained indefinitely without degradation of performance attributes such as the number of recharge cycles possible. The voltage at the point where the internal electrodes contact the battery electrolyte will be called the active electrode voltage (AEV). Hence, this prior art charging method relies on setting the power supply 11 to the maintenance voltage limit to prevent the battery from becoming overcharged. Control 22 on power supply 11 sets the maintenance voltage while control 24 sets the current limit.

FIG. 2 is a graph of battery voltage versus time in minutes showing the battery voltage during charging, and FIG. 3 illustrates the charging current versus time for the same charging operation.

For the particular charging cycle illustrated in FIGS. 2 and 3, the voltage limit (the maintenance voltage) is set at 4.1 volts. The current limit is set at 1.2 A, which is the charging current rate corresponding to the amp-hour capacity of the battery. This charging rate is also known as the C-rate of the battery.

Charging begins at the C-rate, and the voltage begins to rise at the battery terminals as seen in FIG. 2. The current is held constant at the preset current limit of 1.2 A for about 17 minutes, as seen in FIG. 3. When the voltage across the battery terminals reaches 4.1 volts (as determined by the voltage at sense terminals 18 and 19) after approximately 17 minutes of charging, the current begins to drop rapidly as the battery voltage is held constant at 4.1 volts.

After charging has been allowed to continue at the constant voltage limit of 4.1 volts for a preset time of 2.5 hours (or 150 minutes), the charging is terminated, and the voltage across the battery is allowed to relax to a final voltage. This final voltage is approximately 4.072 volts, as seen in FIG. 2. This voltage corresponds to approximately a 0.7% shortfall in reaching the full charge battery voltage of 4.1 volts. Because a 1% shortfall in full charge battery voltage corresponds to approximately a 9% shortfall in charge, the percentage charge shortfall in this example is approximately 6%. Thus, the battery has been charged to only 94% of full charge after 150 minutes or 2.5 hours of charging.

The present inability to obtain a near-full charge on a lithium-ion battery in a charging time almost twice as long as that needed to fully charge nicad or NiMH batteries is a significant factor limiting the present commercial success of lithium-ion battery technology.

The charging time of a battery increases with higher battery resistance and lower slope of the voltage versus charge characteristic. The high resistance of the battery has two portions: 1) the electrical series resistance (ESR) of the battery terminals in series with the fuses, contacts, and wiring of the charger; and 2) the resistance associated with the battery electrodes when making contact with the electrolyte within the battery. FIG. 1 illustrates the battery electrolyte 26 and represents the ESR as resistances 27 and 28.

Where the voltage versus charge slope characteristic of battery 12 is approximately 1 volt/2.5 AH and the resistance of the battery is several hundred milliohms, the resulting charging time constants become a significant fraction of an hour. To reach more than 90% charge, the battery must be charged to more than 99% of full voltage. This high voltage fraction and the long time constant dictated by the lithium-ion battery resistance and voltage versus charge slope may require that the battery be connected to a prior art charger for more than 2.5 hours to reach only 94% of a full charge, as previously mentioned.

The Applicants have found that one reason for the long charge time is that the ESR of the battery causes a significant voltage drop between the external battery terminals and the internal battery electrodes during charging. This voltage drop is the product of the charging current and the ESR. Applicants have found this IR drop to be typically 100 mV when charging at the C-rate.

The long charging time (e.g., 2.5 hours) required for lithium-ion batteries is well understood to be one of the principle barriers to wide commercial acceptance of such battery technology. In contrast, NiMH batteries require approximately one hour to obtain full charge.

What is needed is a technique for more rapidly charging a lithium-ion battery.

SUMMARY

A circuit for charging a lithium-ion battery and a technique for charging the battery are described. The battery charger takes into account the electrical series resistance (ESR) of the battery. The charger contains a compensation circuit which outputs the battery terminal voltage minus the expected voltage drop across the ESR of the battery. This resulting voltage is then applied to the sense terminals of the power supply. The voltage applied to the sense terminals of the power supply is, thus, representative of the active electrode voltage (AEV) of the battery.

In one embodiment, the final lithium-ion battery voltage is desired to be 4.1 volts. The power supply voltage limit is set at 4.175 volts. When the voltage sense input of the power supply reaches the predetermined voltage limit of 4.175 volts, the voltage across the external battery terminals actually reaches a point that is approximately 100 millivolts higher than 4.175 volts because the expected IR drop across the ESR is subtracted from the battery voltage by the compensation circuit. The 100 millivolts is based on an ESR of 0.08 ohms and a charging current of 1.2 A.

After the battery is fully charged, the charging current is removed, and the battery voltage relaxes to the maintenance voltage.

One benefit of this technique is that the constant current initially provided by the power supply is extended well beyond the 17 minutes typical of the prior art techniques to approximately 50 minutes. Another benefit over the prior art is that the charging current is maintained at a higher value even after the preset voltage limit is reached. This is because, during charging, the power supply sense terminals sense a voltage which is lower than the actual external battery terminal voltage. As a result, the lithium-ion battery is charged to within 99.5% of its full charge in about half of the time required by the prior art.

DETAILED DESCRIPTION OF THE PREFERRED EMBODIMENTS

Figure 1:
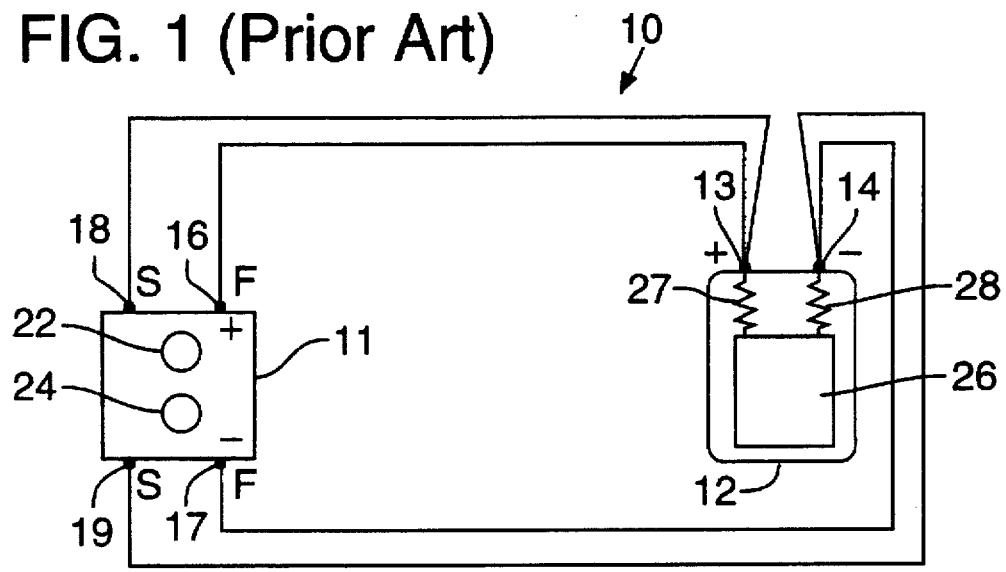
FIG. 1 is a schematic diagram of a prior art battery charger for batteries, including lithium-ion batteries.
Figure 4:
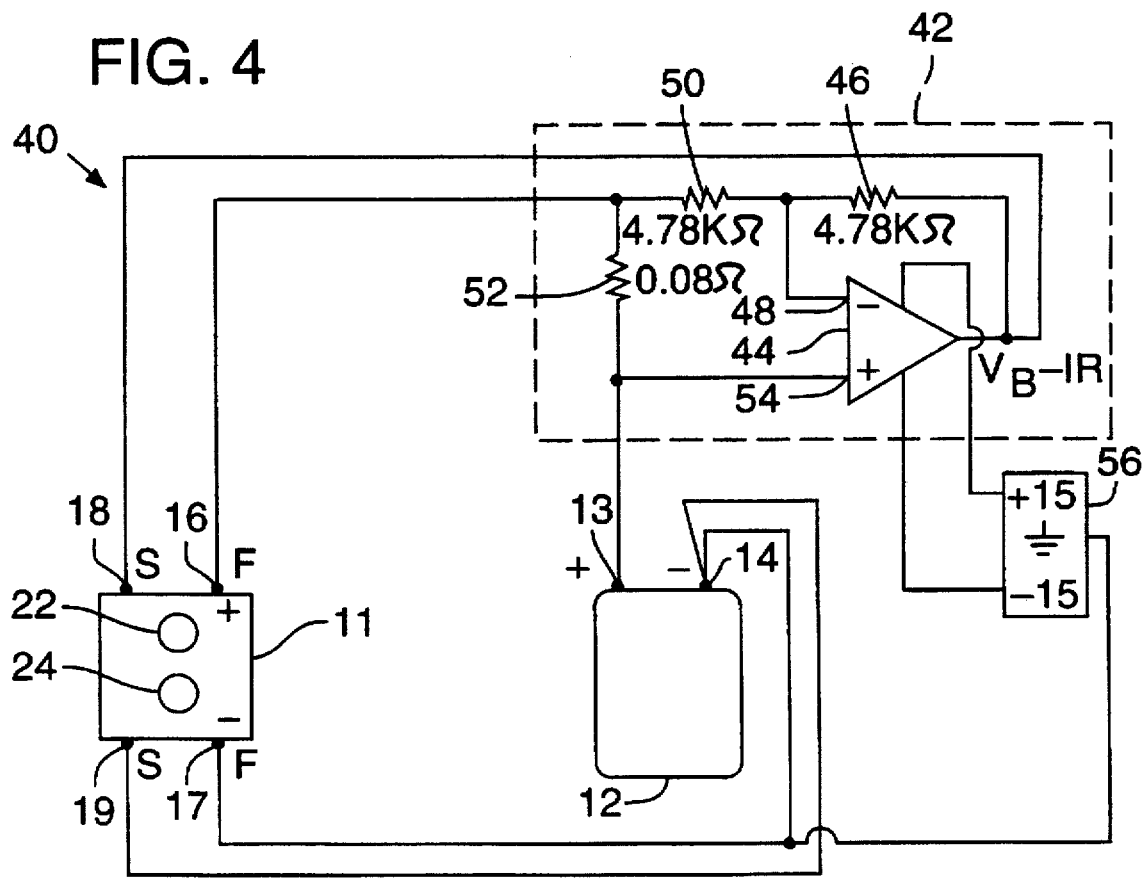
FIG. 4 is a schematic diagram of the preferred embodiment battery charger charging a battery.
Figure 2:
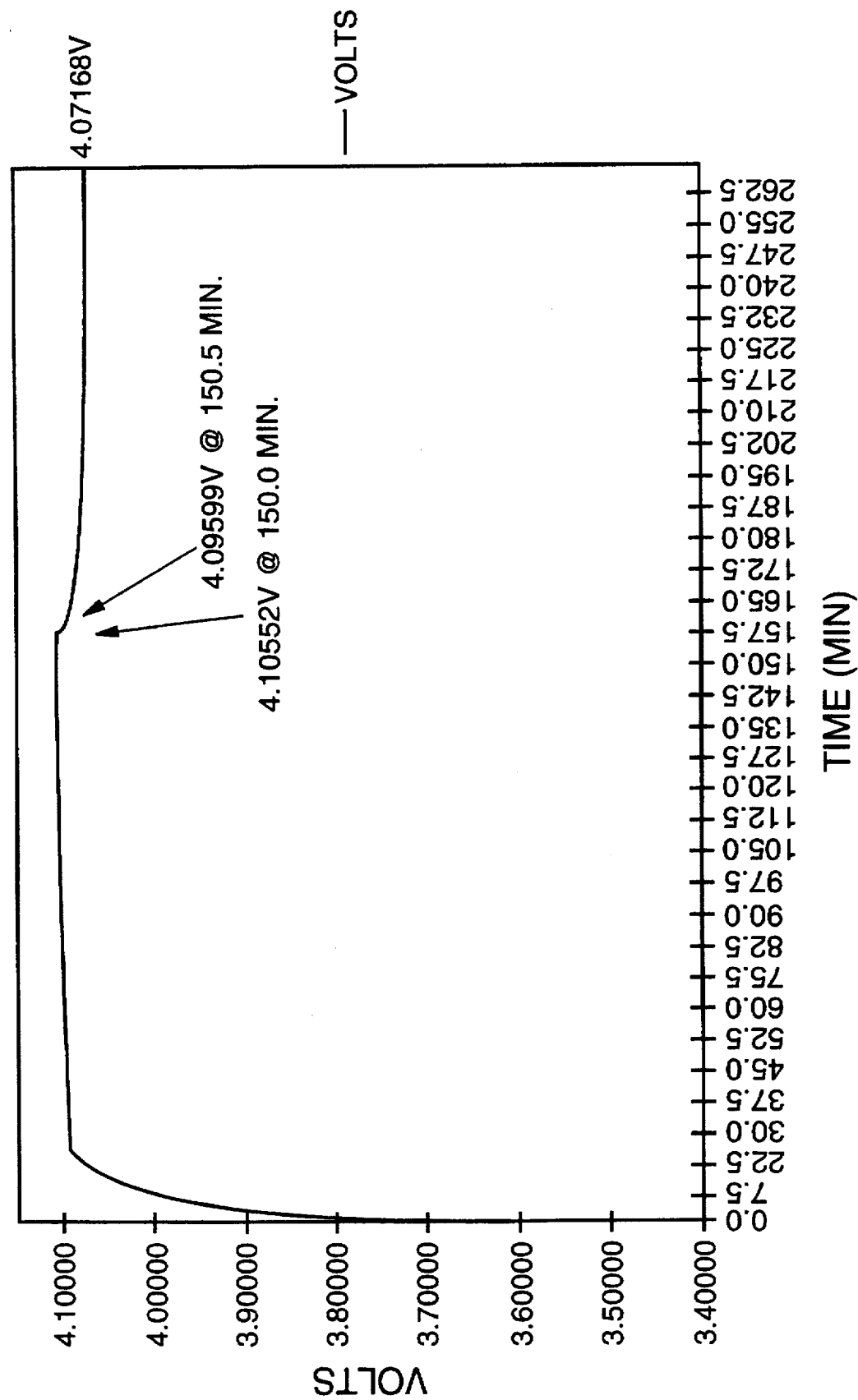
FIG. 2 is a graph of battery voltage versus time during charging of a lithium-ion battery by the circuit of FIG. 1.

The preferred embodiment battery charger 40 is illustrated in FIG. 4. A conventional power supply 11, previously described with respect to FIG. 1, is used for charging battery 12, which may be a conventional 4.1 volt lithium-ion battery, also shown in FIG. 1. Power supply 11 has positive and negative force terminals 16 and 17, respectively, which supply the charging current to battery 12. Power supply 11 also includes positive and negative sense terminal 18 and 19 for sensing a voltage while battery 12 is charging. As in conventional battery charging techniques, a current limit is set by control 24 to not exceed the maximum current capacity, or C-rate, of battery 12. This protects the battery from damage during charging. In one embodiment, the current limit is set at 1.2 A.

A voltage limit is set by control 22 so that the charging current is controlled to cause the voltage at sense terminals 18 and 19 to be maintained at the voltage limit. In one embodiment, this voltage limit is approximately 4.175 volts.

The conventional battery charger of FIG. 1 is modified as shown in FIG. 4 by inserting an ESR compensation circuit 42 between battery 12 and power supply 11. Compensation circuit 42 subtracts from the external battery terminal 13 voltage a voltage representative of the voltage drop between the external battery terminal 13 and the internal electrode in contact with the battery electrolyte. In other words, the subtracted voltage is representative of the voltage drop across the ESR of the battery. The ESR, in one embodiment, is 0.08 ohms.

During the initial charging stage, when a relatively high current is being generated by power supply 11 and applied to battery 12, the voltage drop across the ESR of battery 12 is relatively high. This would normally mean that the internal battery electrodes are at a voltage lower than the desired maintenance voltage. In conventional chargers, only the voltage measured at the external battery terminals is measured, and the charging current provided by power supply 11 will be prematurely reduced prior to the internal battery electrodes achieving the maintenance voltage.

In the charger 40 of FIG. 4, this situation is avoided by the use of op amp 44 connected in a unity gain configuration, with feedback resistor 46 connected between the output of op amp 44 and its inverting terminal 48, and resistor 50 connected between the inverting terminal 48 and the force terminal 16 of power supply 11. Resistors 46 and 50 have equal values, for example, 4.78K ohms. A resistor 52 of a value equal to the ESR of battery 12 is connected between the positive terminal 13 of battery 12 and the force terminal 16. The positive terminal 13 of battery 12 is also connected to the non-inverting input 54 of op amp 44. A second power supply 56 provides the necessary power to op amp 44. Those skilled in the art would understand that there are various other ways to generate a voltage representative of the voltage drop between the external battery terminals 13 and 14 and the internal electrodes of battery 12. These alternative ways are intended to be part of the present invention.

Figure 5:
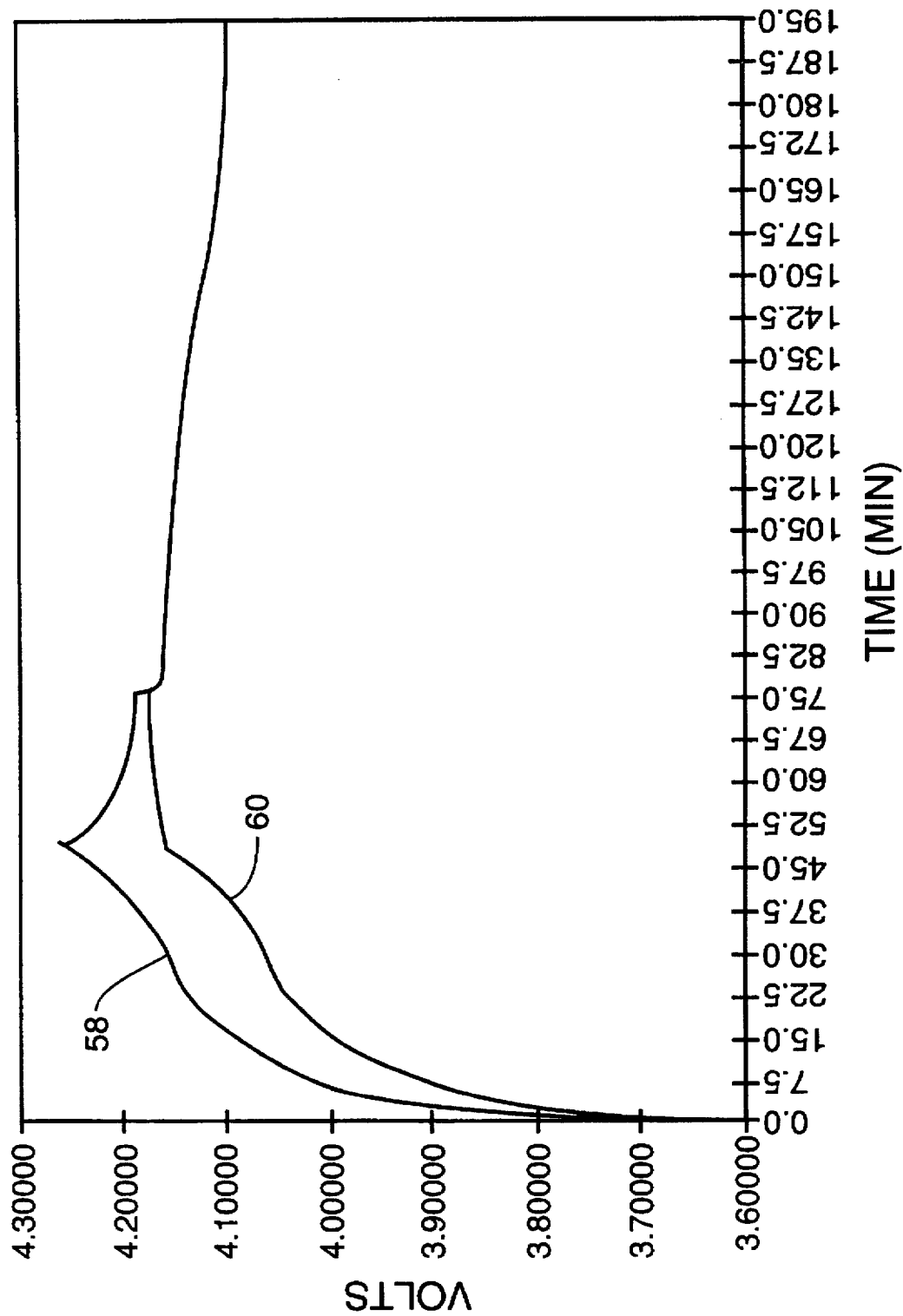
FIG. 5 is a graph of both the external battery terminal voltage and the internal battery electrode voltage versus time while the battery in FIG. 4 is charging.
Figure 6:
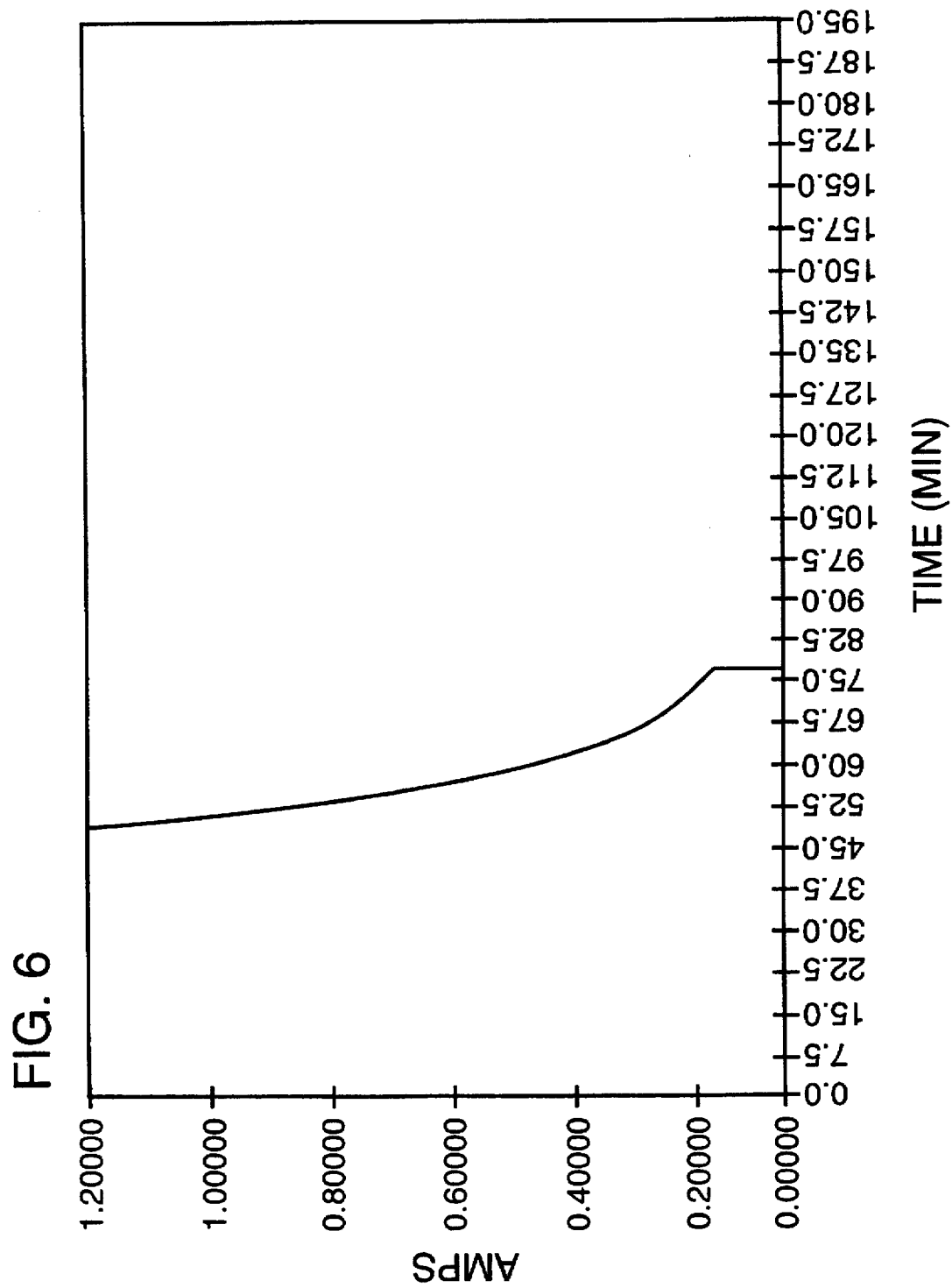
FIG. 6 is a graph of charging current versus time using the battery charger of FIG. 4 during the charging cycle illustrated in FIG. 5.

The top graph 58 in FIG. 5 is the voltage across the external battery terminals 13 and 14 of the conventional lithium-ion battery 12 during a charging operation using the inventive technique. The lower graph 60 is a mathematical approximation of the active electrode voltage (AEV). FIG. 6 is a graph depicting the current through the terminals 13 and 14 of the lithium-ion battery 12 during charging. As shown in FIGS. 5 and 6, when the charging is initiated, the battery 12 voltage is relatively low, and power supply 11 initially provides a high charging current through force terminals 16 and 17 and through resistor 52. During this initial charging period, the charging current is limited by the previously set current limit of 1.2 amps. This initial charging period lasts approximately 50 minutes, during which time the battery 12 voltage increases.

During this constant current period, the difference between the graphs 58 and 60 is due to the IR drop across the ESR of battery 12. The charging current flowing through resistor 52, set to equal the ESR of battery 12, produces a voltage drop across resistor 52 equal to the voltage drop across the ESR of battery 12. The unity gain op amp 44 attempts to maintain the voltage at its inverting input 48 equal to the battery voltage $V_B$. Hence, the voltage which must be produced at the output of op amp 44 to maintain this condition is equal to $V_B$-IR, where R is the resistance of resistor 52.

The output of op amp 44 is connected to the sense terminal 18 of power supply 11 such that the sense terminals 18 and 19 de terminals 18 and 19 detect a voltage which is lower than the voltage across the external battery terminals 13 and 14 by the amount IR. This results in power supply 11 supplying its constant current limit for a longer time than had IR not been deducted from the battery voltage. This also results in the voltage across the external battery terminals 13 and 14 being higher (e.g., 100 mV higher) than the voltage limit, as shown in graph 58 of FIG. 5, which was set at 4,175 volts. At this time, the battery's active electrode voltage (AEV) is approximately 4,175 volts.

When the output of op amp 44 reaches the preset voltage limit of 4.175 volts, power supply 11 reduces the charging current to maintain the voltage across its sense terminals 18 and 19 at approximately the preset voltage limit. As the current through resistor 52 is reduced, the difference between the voltage graphs 58 and 60 becomes less and less. This diminishing difference is reflected in the IR drop across resistor 52.

When it is determined that battery 12 has been fully charged at approximately 75 minutes, the power supply current is stopped, as shown in FIG. 6, and the battery voltage slightly relaxes to the maintenance voltage of approximately 4.1 volts, as illustrated in FIG. 5.

Figure 3:
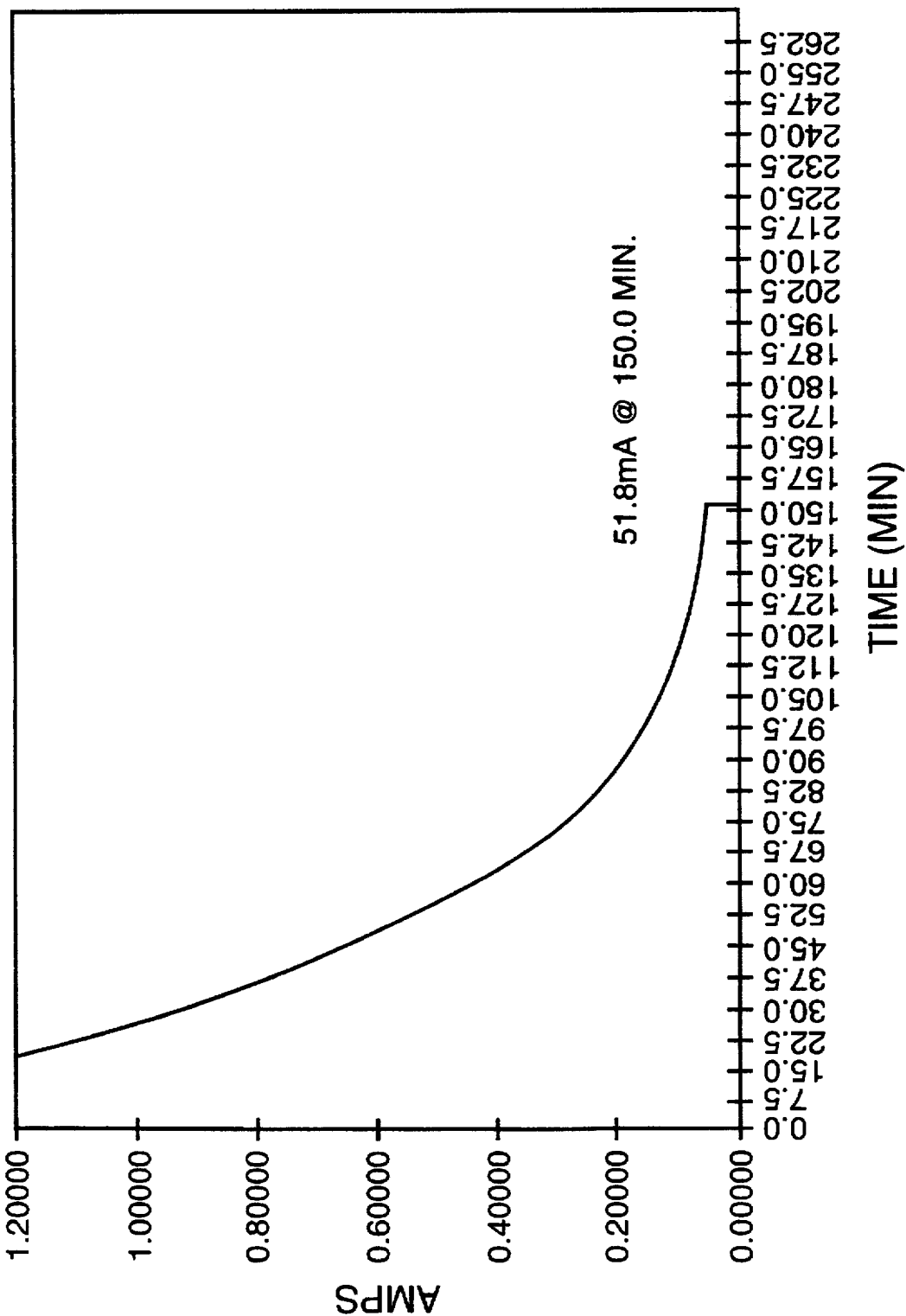
FIG. 3 is a graph of charging current versus time for the circuit of FIG. 1 during the same charging cycle illustrated in FIG. 2.

The fact that the external battery terminals 13 and 14 are allowed to reach a higher voltage than the AEV has two important benefits. The first benefit is that the constant current mode of power supply 11 is extended well beyond the prior art 17 minute period (shown in the prior art graph of FIG. 3) to approximately 50 minutes, as shown in FIG. 6. The second benefit is that the charging current, after the constant current mode, is maintained at a value higher than the prior art value even after the preset voltage limit is reached. This is because, during charging, the power supply sense terminals sense a voltage which is lower than the actual external battery terminal voltage.

The time spent in the constant current charging mode in tests performed according to the present invention is approximately three times longer than in the prior art method. This longer constant current period in combination with the higher charging current needed to maintain the sensed voltage at the voltage limit reduces the total required charging time to one-half of that when using conventional charging techniques.

The charging is stopped manually, or by a simple circuit operating to determine full charge at an elapsed charging time of 1.25 hours. In one test performed by Applicants using the preferred method, the battery voltage decayed to a final value of approximately 4.098 volts rather than the desired 4.1 volts as seen in FIG. 5. This 2 mV or approximately 0.05% shortfall in voltage corresponds to less than a 0.5% shortfall in charge. The battery has therefore been charged to within 99.5% of full charge in half the time required by the prior art.

One important distinction between this invention and the conventional battery charging techniques is that the external battery terminals 13 and 14 are not held at a constant voltage during the charging cycle. This is because the IR drop across resistor 52 diminishes as battery 12 becomes charged.

Figure 7:
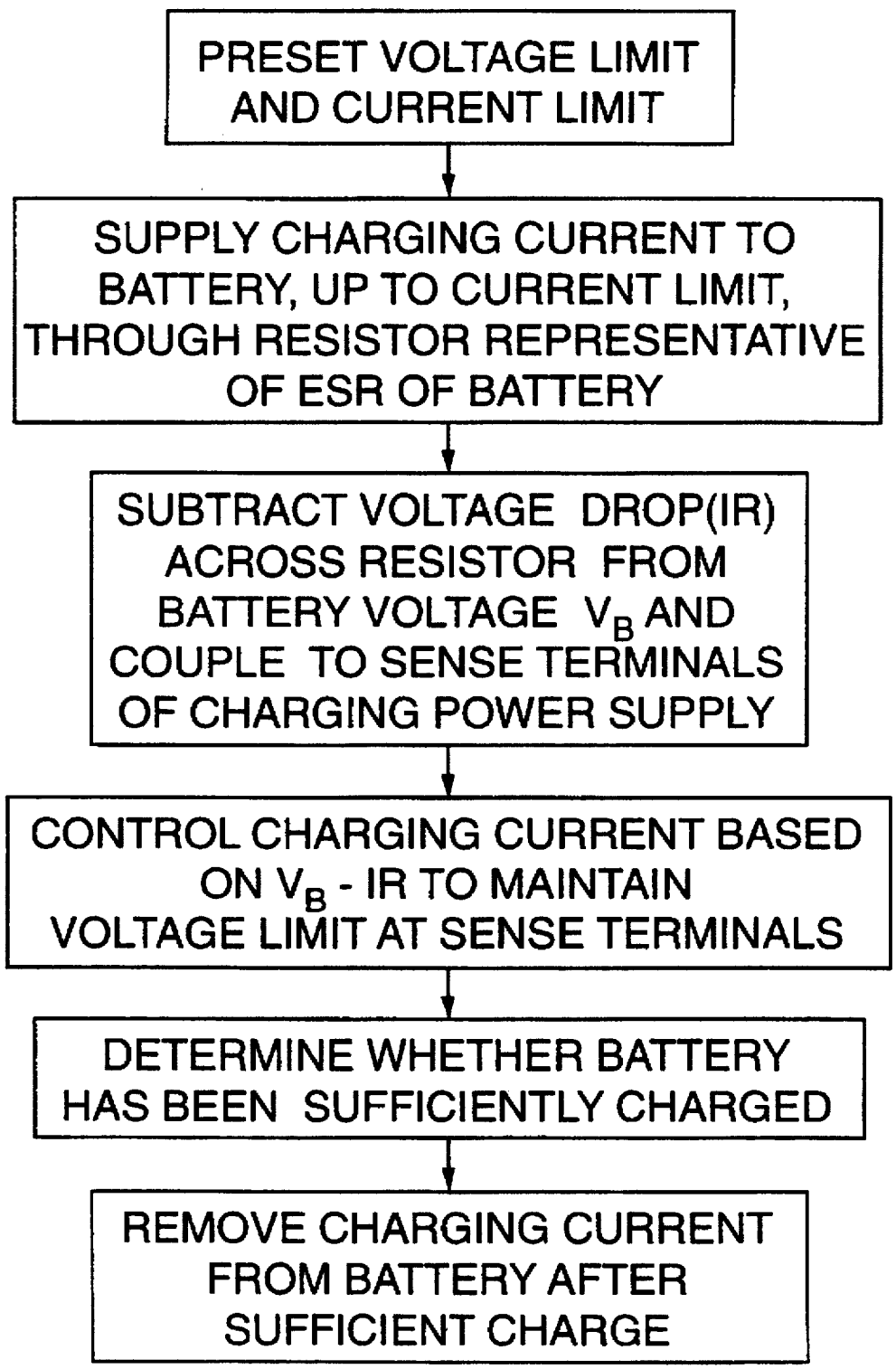
FIG. 7 is a flow chart illustrating the basic steps used in the preferred embodiment battery charger to charge a lithium-ion battery or other battery to its full charge.

FIG. 7 is a flow chart identifying the basic steps used in the preferred charging process.

Figure 8:
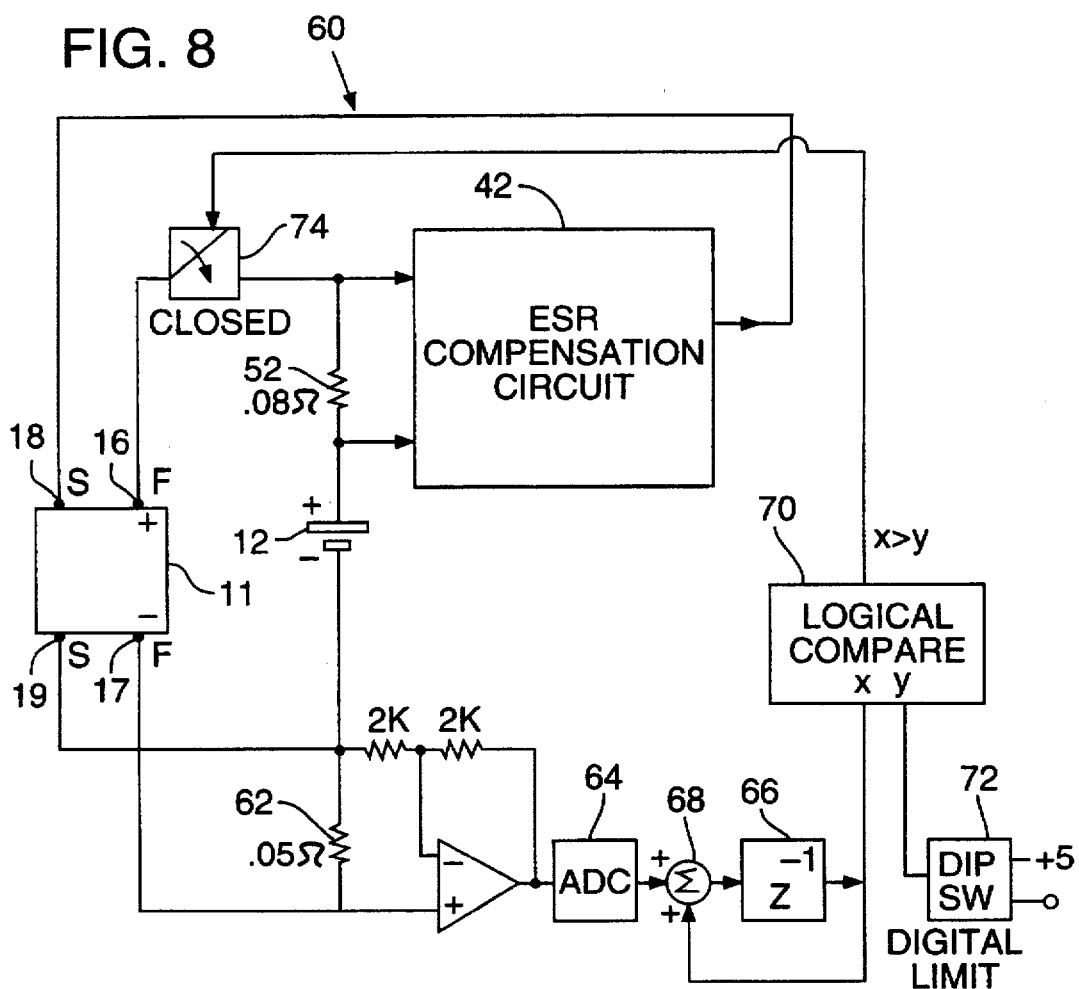
FIG. 8 is a diagram of a circuit for measuring the charge supplied to a battery and automatically shutting off charging current.

FIG. 8 illustrates a circuit 60, referred to as a fuel gauge, constructed using analog and digital building blocks. Fuel gauge 60 measures current through a 50 milliohm current sense resistor 62 by amplifying the sensed voltage and converting it to a digital number by an analog-to-digital converter (ADC) 64. The ADC digital output is added to a register 66 using an adder 68. The number in register 66 corresponds to the battery 12 charge because the ADC 64 output is periodically added to the register 66 contents by means of adder 68.

A logical comparator 70 compares the register 66 contents to the output of a digital representation of the battery full charge limit. As shown in FIG. 8, such digital representation may simply be a DIP switch 72 set to output a binary number corresponding to full charge. When full charge is reached, as determined by the logical comparator 70, a charging switch 74 is opened. The termination of charging may also be accomplished by resetting the final charger voltage setting to equal the battery maintenance voltage when full charge is reached.

Using the preferred embodiment combination of the fuel gauge 60 of FIG. 8, the constant AEV charging apparatus of FIG. 4, and a slightly higher AEV charging voltage than the final, or maintenance, voltage of the battery 12, full charge is quickly reached and the AEV voltage decays to the maintenance voltage shortly after charging is terminated.

Figure 9:
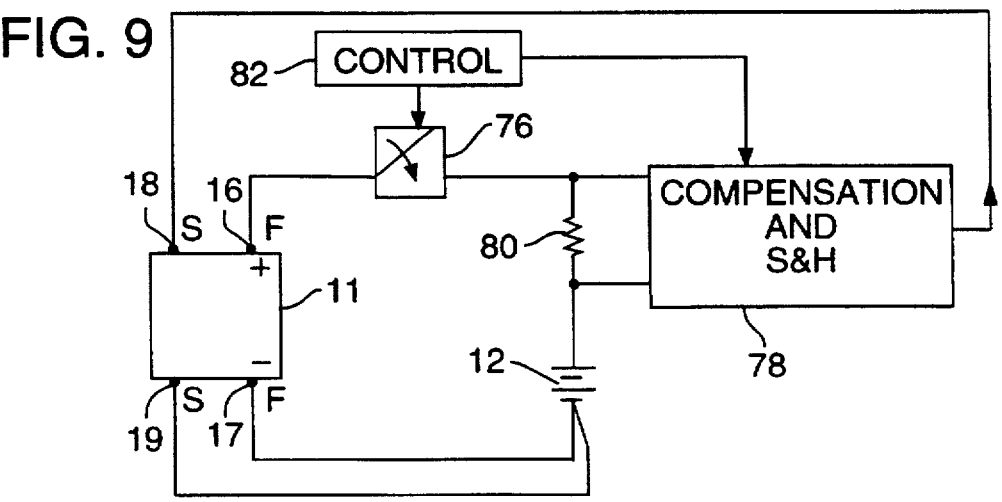
FIG. 9 is a diagram of an alternative embodiment battery charger.

An alternative method and device is shown in FIG. 9 for determining the AEV. The method relies on the measurement of the battery 12 voltage a specific time (such as 1 millisecond) after the opening of a current disconnect switch 76. Other time delays ranging from a fraction of a millisecond to many milliseconds may also be suitable.

Such measured battery voltage will be less than that obtained by subtracting the voltage drop across the ESR from the voltage measured across the battery terminals. Such measured battery voltage may, therefore, require some correction to generate a voltage representing the AEV. The correction is made by adding an additional voltage that is proportional to IxRe, where I is the charging current and Re is an equivalent resistance value chosen to give the correct result.

In general, Re may be a constant value at any given temperature, because the additional voltage is a linear function of charging current at a given temperature. Only one value of Re is appropriate for a given elapsed time between switch opening and voltage measurement. The value of Re is, however, a nonlinear function of the time elapsed between switch 76 opening and the voltage measurement. It also is a nonlinear function of temperature.

The maximum value for Re is just the value required to make the total voltage equal to the voltage present at the terminal of the ESR farthest from the external battery terminal. Smaller values of Re would result in the computation of a lower voltage. Such lower voltage would be appropriate where they are representative of voltages that do not cause any damage within the battery.

FIG. 9 shows the sense terminal 18 of power supply 11 connected to the output of a compensation circuit 78 which provides the corrected voltage at its output. Compensation circuit 78 also provides a sample and hold function to only output the corrected battery voltage existing at the appropriate time. The IR drop across resistor 80 is used by compensation circuit 78 to create the desired compensation voltage. A control circuit 82 provides the timing for switch 76 and compensation circuit 78. The fuel gauge 60 of FIG. 8 may be used in conjunction with the battery charger of FIG. 9 to terminate the charging operation.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed:

1. A method for charging a battery comprising the steps of:

providing charging current to an external terminal of a battery through a first impedance, said first impedance being approximately equal to an electrical series resistance between said external terminal and an electrode internal to said battery;

detecting a voltage drop across said first impedance;

generating a first voltage representative of a voltage at said electrode internal to said battery, said first voltage being based on said voltage drop and said voltage at said external terminal; and applying said first voltage to a sense circuit for comparing said first voltage to a preset voltage to control said charging current to maintain said first voltage at approximately said preset voltage.

2. The method of claim 1 wherein said first voltage is higher than a maintenance voltage for said battery.

3. The method of claim 1 further comprising the step of automatically terminating said charging current to said battery, said step of automatically terminating comprising the steps of:

measuring a charge applied to said battery;

determining when said charge is equivalent to a substantially full charge of said battery; and terminating said charging current to said battery.

4. The method of claim 3 wherein said step of automatically terminating comprises the steps of:

supplying a charging current through a sense resistor;

generating a second voltage relating to a voltage drop across said sense resistor;

converting said second voltage to a present digital value;

adding said present digital value to a previously stored digital value to create a sum digital value;

comparing said sum digital value to a reference value indicative of a substantially full battery charge;

generating a control signal if it is determined based upon said step of comparing that said battery is sufficiently charged; and applying said control signal to a switch for ceasing the application of said charging current to said battery.

5. The method of claim 1 wherein said battery is a lithium-ion battery.

6. The method of claim 1 further comprising the steps of:

digitally integrating said charging current to determine when a sufficient charge is reached, and upon such determination, ceasing application of said charging current to said battery.

7. A method for charging a battery comprising the steps of:

providing charging current to an external terminal of a battery through a first impedance, said first impedance being related to a series resistance between a current supplying terminal of a power supply and an electrode internal to said battery;

detecting a voltage drop across said first impedance;

generating a first voltage representative of a voltage at said electrode internal to said battery, said first voltage representing the voltage at said external terminal minus said voltage drop caused by said charging current through said first impedance; and applying said first voltage to a sense circuit for comparing said first voltage to a preset voltage to control said charging current to maintain said first voltage at approximately said preset voltage.

8. The method of claim 7 wherein said first voltage is higher than a maintenance voltage for said battery.

9. The method of claim 7 further comprising the step of automatically terminating said charging current to said battery, said step of automatically terminating comprising the steps of:

measuring a charge applied to said battery;

determining when said charge is equivalent to a substantially full charge of said battery; and terminating said charging current to said battery.

10. The method of claim 9 wherein said step of automatically terminating comprises the steps of:

supplying a charging current through a sense resistor;

generating a second voltage relating to a voltage drop across said sense resistor;

converting said second voltage to a present digital value;

adding said present digital value to a previously stored digital value to create a sum digital value;

comparing said sum digital value to a reference value indicative of a substantially full battery charge;

generating a control signal if it is determined based upon said step of comparing that said battery is sufficiently charged; and applying said control signal to a switch for ceasing the application of said charging current to said battery.

11. The method of claim 7 wherein said battery is a lithium-ion battery.

12. The method of claim 7 further comprising the steps of:

digitally integrating said charging current to determine when a sufficient charge is reached, and upon such determination, ceasing application of said charging current to said battery.

13. A method for charging a battery, said battery having external electrodes exposed through a housing of said battery and having internal electrodes in contact with an electrolyte, said method comprising the steps of:

establishing a maintenance voltage determined to be a voltage at which the battery internal electrodes can be maintained without adversely affecting recharging of the battery;

charging said battery through a first impedance so that said external electrodes are held at a voltage greater than said maintenance voltage, said first impedance being approximately equal to an electrical series resistance between said external electrodes and said internal electrodes; and terminating said charging of said battery after it has been determined that said battery has been sufficiently charged.

14. The method of claim 13 wherein said step of terminating said charging current comprises the steps of:

supplying a charging current through a sense resistor;

generating a first voltage relating to a voltage drop across said sense resistor;

converting said first voltage to a present digital value;

adding said present digital value to a previously stored digital value to create a sum digital value;

comparing said sum digital value to a reference value indicative of a substantially full battery charge;

generating a control signal if it is determined based upon said step of comparing that said battery is sufficiently charged; and applying said control signal to a switch for ceasing the application of said charging current to said battery.

15. The method of claim 13 wherein said battery is a lithium-ion battery.

16. A battery charger comprising:

a power supply having a charging current terminal;

an impedance, related to an electrical series resistance of said battery, connected in series between said charging current terminal and an external battery terminal;

a measuring circuit connected across said impedance for generating a first voltage representative of a voltage at an electrode internal to said battery, said first voltage representing the voltage at said external battery terminal minus a voltage drop caused by a charging current through said impedance; and a voltage sense circuit connected to an output of said measuring circuit for comparing said first voltage to a preset voltage and causing said charging current to maintain said first voltage at approximately said preset voltage.

17. The charger of claim 16 wherein said voltage sense circuit is located within said power supply.

18. The charger of claim 16 wherein said measuring circuit is a unity gain operational amplifier having input terminals connected across said impedance.

19. The charger of claim 16 wherein said battery is a lithium-ion battery.

20. The charger of claim 13 further comprising a battery charge detection circuit, said battery charge detection circuit comprising:

a sense resistor connected in series between an external battery terminal and a charging current terminal;

an analog-to-digital converter connected to said sense resistor for converting an analog voltage representative of a voltage across said sense resistor to a digital value;

an adder connected to an output of said analog-to-digital converter for integrating a digital value output from said analog-to-digital converter and outputting an integrated value;

a comparator for comparing said integrated value to a stored digital value, said stored digital value representing a substantially full charge of said battery and said integrated value representing a present charge of said battery; and a switch connected to an output of said comparator for ceasing the application of charging current to said battery when it is determined by said comparator that said battery is sufficiently charged.

21. A battery charger comprising:

a power supply having a charging current terminal;

an impedance connected in series between said charging current terminal and an external battery terminal, said impedance being approximately equal to an electrical series resistance between said external battery terminal and an electrode internal to said battery;

a measuring circuit connected across said impedance for generating a first voltage representative of a voltage at said electrode internal to said battery, said first voltage being less than a voltage at said external battery terminal; and a voltage sense circuit connected to an output of said measuring circuit for comparing said first voltage to a preset voltage and causing said charging current to maintain said first voltage at approximately said preset voltage.

22. The charger of claim 21 wherein said voltage sense circuit is located within said power supply.

23. The charger of claim 21 wherein said measuring circuit is a unity gain operational amplifier having input terminals connected across said impedance.

24. The charger of claim 21 wherein said battery is a lithium-ion battery.

25. The charger of claim 21 further comprising a battery charge detection circuit, said battery charge detection circuit comprising:

a sense resistor connected in series between an external battery terminal and a charging current terminal;

an analog-to-digital converter connected to said sense resistor for converting an analog voltage representative of a voltage across said sense resistor to a digital value;

an adder connected to an output of said analog-to-digital converter for integrating a digital value output from said analog-to-digital converter and outputting an integrated value;

a comparator for comparing said integrated value to a stored digital value, said stored digital value representing a substantially full charge of said battery and said integrated value representing a present charge of said battery; and a switch connected to an output of said comparator for ceasing the application of charging current to said battery when it is determined by said comparator that said battery is sufficiently charged.

* * * * *